US009350682B1

(12) United States Patent
Gupta et al.

(10) Patent No.: US 9,350,682 B1
(45) Date of Patent: May 24, 2016

(54) COMPUTE INSTANCE MIGRATIONS ACROSS AVAILABILITY ZONES OF A PROVIDER NETWORK

(71) Applicant: Amazon Technologies, Inc., Reno, NV (US)

(72) Inventors: Diwakar Gupta, Seattle, WA (US); Jean-Paul Bauer, Seattle, WA (US); Kevin Robert Scaife, Western Cape (ZA); Marc Nevin Daya, Western Cape (ZA)

(73) Assignee: Amazon Technologies, Inc., Reno, NV (US)

( * ) Notice: Subject to any disclaimer, the term of this patent is extended or adjusted under 35 U.S.C. 154(b) by 117 days.

(21) Appl. No.: 14/447,519

(22) Filed: Jul. 30, 2014

(51) Int. Cl.
*G06F 15/16* (2006.01)
*H04L 12/911* (2013.01)

(52) U.S. Cl.
CPC .................................. *H04L 47/746* (2013.01)

(58) Field of Classification Search
CPC ... H04L 47/746; H04L 67/10; H04L 41/0823; H04L 41/0803; G06F 15/16; G06F 15/173; G06F 3/0647
USPC .................................. 709/223, 226; 370/237
See application file for complete search history.

(56) References Cited

U.S. PATENT DOCUMENTS

| | | | |
|---|---|---|---|
| 7,761,573 B2 | 7/2010 | Travostino et al. | |
| 8,635,318 B1 * | 1/2014 | Shankar | H04L 41/085 709/205 |
| 8,660,129 B1 * | 2/2014 | Brendel | H04L 12/4641 370/397 |
| 9,154,327 B1 * | 10/2015 | Marino | G06Q 30/04 |
| 2005/0160230 A1 * | 7/2005 | Doren | G06F 12/0828 711/141 |
| 2006/0053251 A1 * | 3/2006 | Nicholson | G06F 3/061 711/114 |
| 2011/0072504 A1 * | 3/2011 | Abderrazzaq | H04L 63/0227 726/11 |
| 2011/0197039 A1 * | 8/2011 | Green | G06F 3/0617 711/162 |
| 2011/0282982 A1 | 11/2011 | Jain | |
| 2013/0007216 A1 | 1/2013 | Fries et al. | |
| 2013/0346619 A1 | 12/2013 | Panuganty et al. | |
| 2014/0123135 A1 | 5/2014 | Huang et al. | |
| 2015/0146539 A1 * | 5/2015 | Mehta | H04L 47/125 370/237 |
| 2015/0154047 A1 * | 6/2015 | Chen | G06F 9/4856 718/103 |
| 2015/0378623 A1 * | 12/2015 | White | G06F 3/0619 711/162 |

* cited by examiner

*Primary Examiner* — Tesfay Yohannes
(74) *Attorney, Agent, or Firm* — Robert C. Kowert; Meyertons, Hood, Kivlin, Kowert & Goetzel, P.C.

(57) ABSTRACT

A provider network may implement compute instance migrations across availability zones. Compute instances may be located in a particular availability zone of provider network that is implemented across multiple availability zones. A request may be received, from a client of the provider network or other component of the provider network, to migrate a compute instance that is currently operating for a client and located in one availability zone to another availability zone. A destination compute instance may be provisioned in the other availability zone based on a configuration of the currently operating compute instance. In some embodiments, other computing resources utilized by the currently operating compute instance, such as data storage resources, may be moved to the other availability zone. Migration may be completed such that the destination compute instance is currently operating for the client and the compute instance is not.

17 Claims, 9 Drawing Sheets

COMPUTE INSTANCE MIGRATIONS ACROSS AVAILABILITY ZONES OF A PROVIDER NETWORK

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtual machines may be provided as part of a provider network that offers use of virtual machines to multiple different clients. The virtual machines may be hosted in different locations, of which each location may continue operating independent of faults or failures that may occur in other locations. Clients may wish to locate virtual machines in diverse locations to provide greater fault tolerance for applications implemented by the virtual machines.

Figure 1:
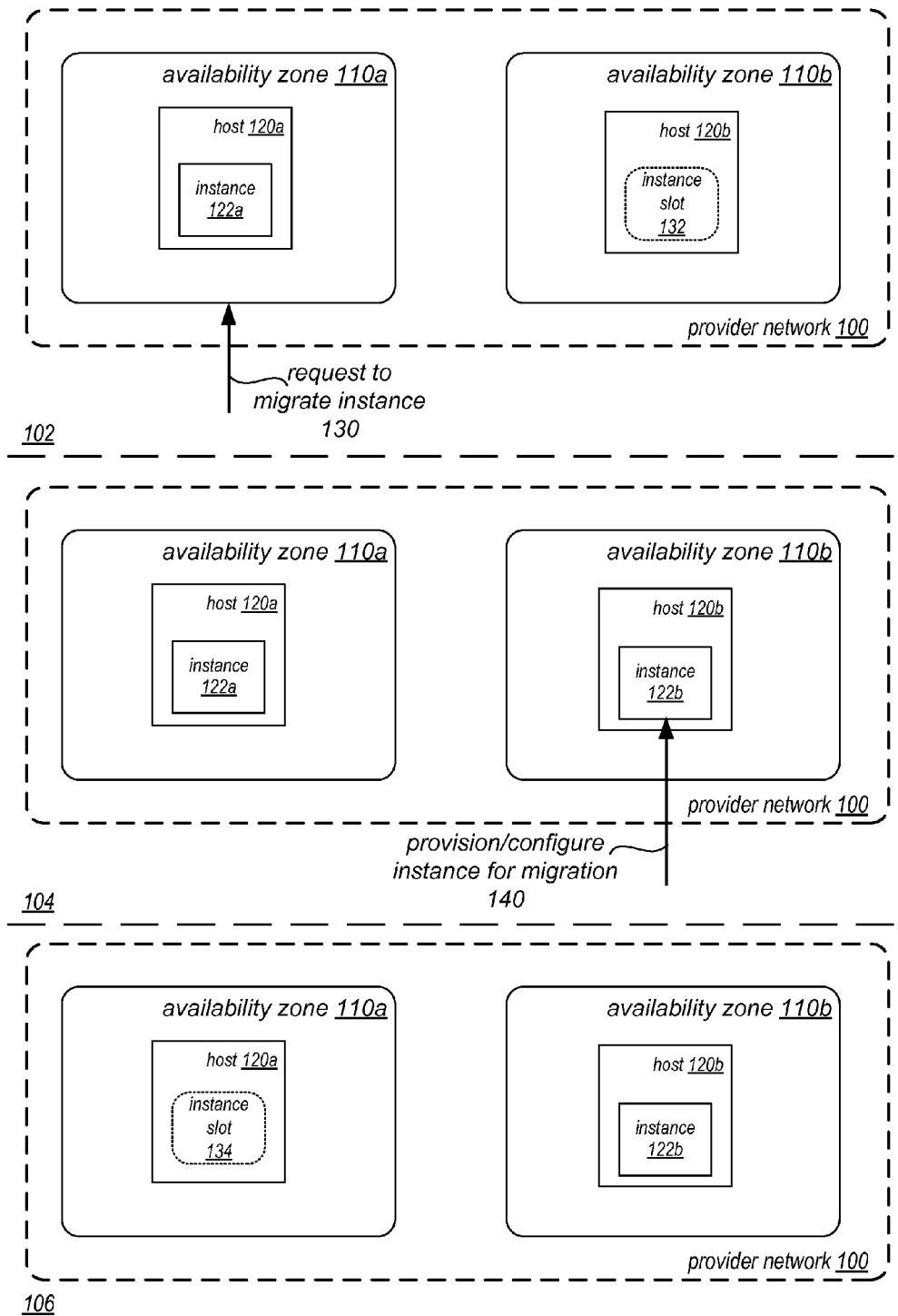
FIG. 1 is a series of block diagrams illustrating the migration of a compute instance from one availability zone to another, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may perform compute instance migrations across availability zones for provider networks, according to some embodiments. A provider network may supply clients, operators, or other customers with access to and/or control of one or more computing resources. These resources may include various types of computing systems or devices configured for communication over a network. For example, in some embodiments, a provider network may provide virtual computing resources to clients, users, or other type of customers, in the form of compute instances (e.g., a virtual machine acting as a distinct logical computing system that provides users with the illusion that they are the sole operators and administrators of a given hardware computing resource). Clients of the provider network may reserve (i.e., purchase or buy) one or more compute resources (such as compute instances) to perform various functions, services, techniques, and/or applications.

For durability and availability, provider networks may distribute computing systems, nodes, servers or other devices across different availability zones. An availability zone may be a fault tolerant zone that may operate independently of a failure of another availability zone in the provider network. Availability zones may be geographically diverse, in some embodiments. For instance, one or more data centers that may implement a particular availability zone may be located in a different geographic location (e.g., different city, county, state, country, or continent). Independent power sources, networking infrastructure, or various other configurations of resources in an availability zone may allow for availability zones to be independently accessible to client or management (e.g., control plane) requests. In at least some embodiments, network infrastructure allowing communication between availability zones (e.g., limited bandwidth).

For various reasons, it may be desirable to locate compute instances and other computing resources for clients in a particular availability zones. If, for instance, a client wishes to provide greater durability for a service, application, or other functionality provided by compute instances, the compute instances may be distributed across different availability zones, insulating the individual instances from failures in the other availability zones. In another example, clients may also receive purchase or utilization incentives to operate compute instances and resources in particular availability zones. In some scenarios, a client can be notified of, or determine that, a particular availability zone may be failing, encountering networking problems (e.g., network partition), or experiencing high utilization, which may be alleviated if client instances located in the availability zone were migrated to another availability zone. Consequently, for compute instances that are already operating in one availability zone it may be advantageous to migrate the operating compute instance to another availability zone.

FIG. 1 is a series of block diagrams illustrating the migration of a compute instance from one availability zone to another, according to some embodiments. At scene 102 provider network 100 is illustrated as implementing two different availability zones, 110a and 110b. Located in availability zone 110a, host 120a (which may a computing node or server) implements virtual compute instance 122a for a client. Virtual compute instance 122a may be currently operating, performing various services, functions or tasks for the client of provider network 100. However, it if is determined that the instance 122a should be moved to another availability zone (e.g., to create greater durability or availability), then a request to migrate the instance 130 may be received. In various embodiments, clients of provider network 100 or components of the provider network 100 (e.g., a control plane) may send the request to migrate. In some embodiments, the request may specify the availability zone to migrate the instance to—while in other embodiments, the availability zone to receive the compute instance may be dynamically determined after the receipt of the request.

As illustrated in scene 102 availability zone 110b has a host 120b with an available instance slot 132. Therefore, in scene 104, a new destination compute instance 122b may be provisioned and/or configured for migration 140. The configuration of compute instance 122b may be based on the configuration of instance 122a in order to provide the appearance of moving the instance (e.g., software, hardware, stored data) to the new availability zone 110b. In some embodiments, other computing resources, such as a data storage volume located on storage nodes in availability zone 110a and utilized by instance 122a may be moved to newly provisioned storage nodes in availability zone 110b as well.

As illustrated in scene 106, the instance 122b may then be currently operating for the client, while the original instance at host 120a in availability zone 110a may be stopped and/or released for hosting another compute instance, completing the migration of instance 122a to availability zone 110b. Various different techniques may be employed to complete the migration, such as reboot migration described below with regard to FIG. 6 and live migration described below with regard to FIG. 7. A network address for instance 122a may also be moved such that requests directed toward instance 122a are now directed toward instance 122b, in some embodiments.

Please note that previous descriptions are not intended to be limiting, but are merely provided as an example of provider networks, availability zones, and compute instances. Various other components may interact with or assist in performing cross availability zone migrations for compute instances.

The specification next includes a general description of a provider network including multiple availability zones, which may perform cross availability zone migrations. Then various examples of a provider network are discussed, including different components/modules, or arrangements of components/module that may be employed as part of implementing a provider. A number of different methods and techniques to implement cross availability zone migrations for compute instances of a provider network are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
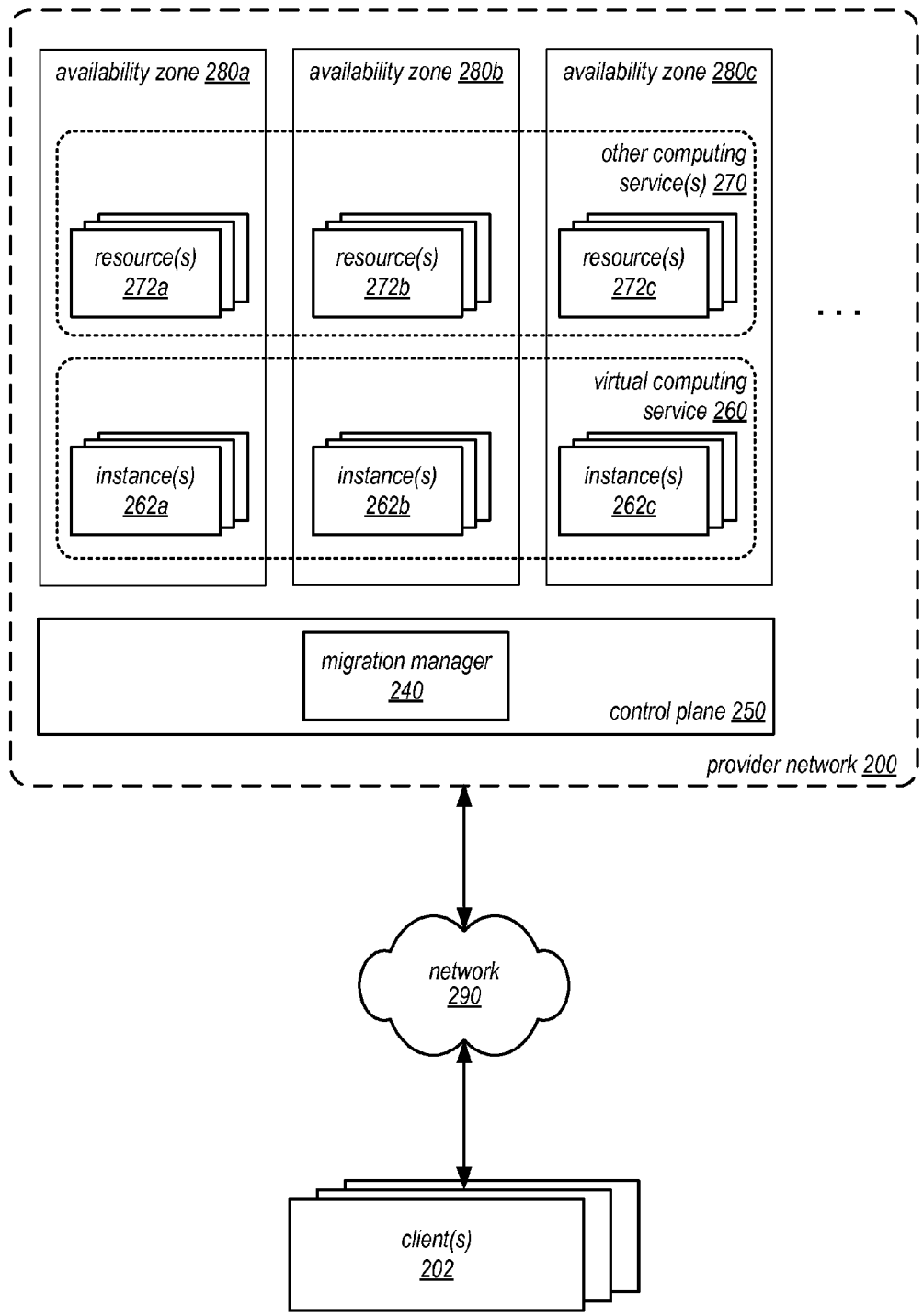
FIG. 2 is a block diagram illustrating a provider network provides compute instances and other computing resources distributed across different availability zones, according to some embodiments.

FIG. 2 is a block diagram illustrating a provider network provides compute instances and other computing resources distributed across different availability zones, according to some embodiments. Provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the provider network 200. In various embodiments, provider network 200 may include numerous availability zones 280, which may be implemented as fault tolerant zones for hosting and or providing services as part of provider network 200. Operation of a particular availably zone may continue irrespective of a failure of another availability zone. In some embodiments, provider network 200 may provide virtual computing resources as part of virtual computing service 260. These computing resources may in some embodiments be offered to clients in units called "instances," 262 such as virtual or physical compute instances or storage instances located in individual availably zones 280. Similarly, other computing service(s) 270, which may include various storage, processing, networking or any other computing resource may be provided as resources 272.

A virtual compute instance 262a may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 262 of provider network 200 in different embodiments, including general purpose or special purpose computer servers, storage devices, network devices and the like.

Compute instances 262 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 202 applications, without for example requiring the client 202 to access an instance 262. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, compute instances 262 may be associated with one or more different security groups. Security groups may enforce one or more network traffic policies for network traffic at members of the security group. Membership in a security group may not be related to physical location or implementation of a compute instance. A security group may enforce respective network traffic policies for their member instances. The previous descriptions are not intended to be limiting, but merely illustrative of the many different configurations possible for a compute instances provided by provider network 200.

Different availability zones 280 may be configured to host different virtual compute instances 262. For example availability zone 280a hosts instances 262a, availability zone 280b hosts instances 262b, and availability zone 280c hosts instances 262c. Multiple virtualization hosts (e.g., compute nodes, systems or servers, such as computing system 1000 described below with regard to FIG. 9) may be respectively located in individual availability zones 280 may implement and/or manage multiple compute instances 262, in some embodiments. A virtualization host may include a virtualization management module capable of instantiating and managing a number of different client-accessible virtual machines or compute instances 262. The virtualization management module may include, for example, a hypervisor and an administrative instance of an operating system, which may be termed a "domain-zero" or "dom0" operating system in some implementations. The dom0 operating system may not be accessible by clients on whose behalf the compute instances 262 run, but may instead be responsible for various administrative or control-plane operations of the network provider, including responding to requests to provision, configure, start and/or stop compute instances 262.

In various embodiments, other computing services may provide resources 272 in similar ways. For instance, resources 272a may be located in availability zone 280a, resource(s) 272b may be located in availability zone 280b and resources 272c may be located in availability zone 280c. Various compute nodes, servers, systems, or devices (e.g., computing system 1000 in FIG. 9) may be located in respective availability zones 280 and may implement or host the resources 272. One or more storage nodes, for example, may store a data volume resource 272a that acts as a virtual block storage device for a particular instance 262a.

In various embodiments provider network 200 may also implement a control plane 250. Control plane 250 may provide and/or perform various administrative functions and tasks for virtual computing service 260 and other computing service(s) 270. For example, control plane 250 may implement various client management features. For example, control plane 250 may coordinate the metering and accounting of client usage of network-based services, including computing resources, such as by tracking the identities of requesting clients 202, the number and/or frequency of client requests, the types and times instances 262 are utilized, size of data stored or retrieved on behalf of clients 202, overall storage bandwidth used by clients 202 or any other measurable client usage parameter. Control plane 250 may also implement financial accounting and billing systems, or may maintain a database of usage data that may be queried and processed by external systems for reporting and billing of client usage activity. In certain embodiments, control plane 250 may be configured to collect, monitor and/or aggregate a variety of provider network operational metrics, such as metrics reflecting the rates and types of requests received from clients 202, bandwidth utilized by such requests, system processing latency for such requests, system component utilization (e.g., network bandwidth and/or utilization within the provider network and within specific availability zones), rates and types of errors, or any other suitable metrics. In some embodiments such metrics may be used by system administrators to tune and maintain system components, while in other embodiments such metrics (or relevant portions of such metrics) may be exposed to clients 202 to enable such clients to monitor their usage of virtual computing service 260, and/or other computing service(s) 270 (or the underlying systems that implement those services).

In some embodiments, control plane 250 may also implement user authentication and access control procedures. For example, for a given network-based services request to access a particular instance, control plane 250 may be configured to ascertain whether the client 202 associated with the request is authorized to access the particular instance. Control plane 250 may determine such authorization by, for example, evaluating an identity, password or other credential against credentials associated with the particular database, or evaluating the requested access to the particular instance against an access control list for the particular instance.

In at least some embodiments, control plane 240 may implement migration manager 240. Migration manager 240 may be configured manage, direct and otherwise facilitate cross availability zone migrations for compute instances and resources in provider network 200. Facilitating cross availability zone migrations may account for the various communication constraints between availability zones (which may be implemented as part of providing independently-accessible, fault-tolerant zones. FIGS. 3-8 describe various different techniques, messages, and other capabilities of migration manager 240.

In some embodiments, provider network may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components 250 as well as external networks 290 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory (e.g., provided by mapping service in control plane 250) to determine what their tunnel target should be. The IP tunneling technology provides a virtual network topology; the interfaces that are presented to clients 202 may be attached to the overlay network so that when a client 202 provides an IP address that they want to send packets to, the IP address is run in virtual space by communicating with a mapping service that knows where the IP overlay addresses are. Implementing the overlay network may allow network addresses to moved or attached to different resources, such as compute instances, when performing cross availability zone migrations for compute instances.

Clients 202 may encompass any type of client configurable to submit requests to network provider 200. For example, a given client 202 may include a suitable version of a web browser, or may include a plug-in module or other type of code module configured to execute as an extension to or within an execution environment provided by a web browser. Alternatively, a client 202 may encompass an application such as a computing resource tool or application (or user interface thereof), a media application, an office application or any other application that may make use of compute instances 262 or resources 272 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 262 in a manner that is transparent to applications implement on the client 202 utilizing computational resources provided by the compute instance 262.

Clients 202 may convey network-based services requests to provider network 200 via network 29. In various embodiments, network 290 may encompass any suitable combination of networking hardware and protocols necessary to establish network-based communications between clients 202 and provider network 200. For example, a network 290 may generally encompass the various telecommunications networks and service providers that collectively implement the Internet. A network 290 may also include private networks such as local area networks (LANs) or wide area networks (WANs) as well as public or private wireless networks. For example, both a given client 202 and provider network 200 may be respectively provisioned within enterprises having their own internal networks. In such an embodiment, a network 290 may include the hardware (e.g., modems, routers, switches, load balancers, proxy servers, etc.) and software (e.g., protocol stacks, accounting software, firewall/ security software, etc.) necessary to establish a networking link between given client 202 and the Internet as well as between the Internet and provider network 200. It is noted that in some embodiments, clients 202 may communicate with provider network 200 using a private network rather than the public Internet.

Figure 3:
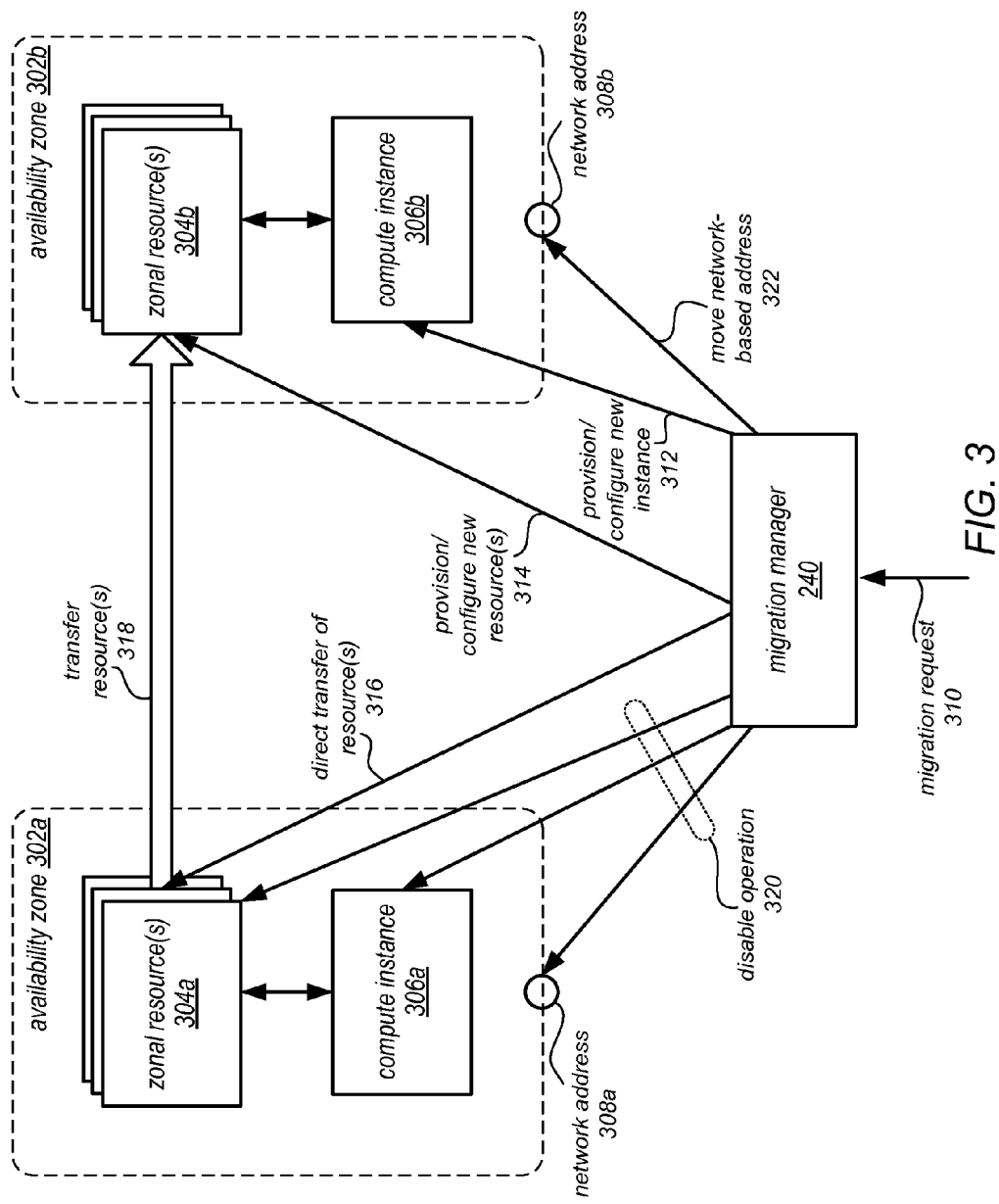
FIG. 3 is a block diagram illustrating an example of a migration manager directing the migration of a compute instance from one availability zone to another availability zone, according to some embodiments.

FIG. 3 is a block diagram illustrating an example of a migration manager directing the migration of a compute instance from one availability zone to another availability zone, according to some embodiments. Migration manager 240 may receive a migration request 310 for compute instance 306a located in availability zone 302a. A new availability zone 302b may be determined/identified (e.g., based on a specification of availability zone 302b in the request 310 or may be dynamically determined the availability zone 302b in some embodiments).

Figure 5:
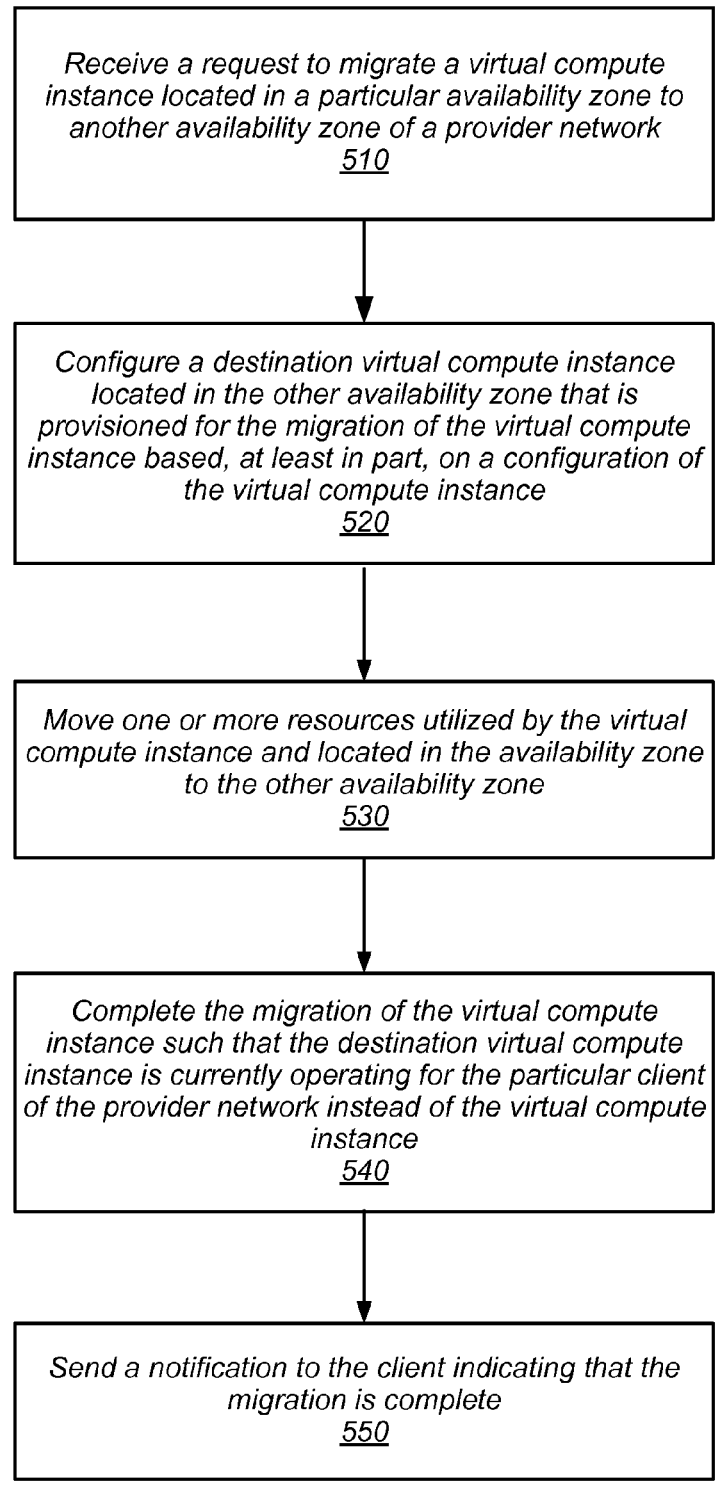
FIG. 5 is high-level flowchart illustrating various methods and techniques for performing compute instance migrations across availability zones in a provider network, according to some embodiments.

Once the availability zone 302b is identified, migration manager 240 may then provision/configure compute instance 306b to serve as a destination compute instance for compute instance 306a. This provision/configuration may configure compute instance 306b based, at least in part, on the current configuration of compute instance 306a (which may include moving any data stored locally at compute instance 306a to compute instance 306b). FIG. 5 describes in further detail the various ways in which compute instance 306b may be provisioned and configured, in some embodiments. If, as illustrated in FIG. 3, zonal resources (e.g., resources 272 provided by other computing service(s) 270 in FIG. 2 above) 304a are being utilized by compute instance 306a, the migration manager 240 may provision/configure 314 new zonal resources 302b to be utilized by compute instance 306b, in some embodiments. In some embodiments, zonal resource(s) 304a may be resources that contain data or information that may be transferred 318 as part of moving zonal resources 304a to zonal resources 304b. Thus, migration manager 316 may be configured to direct and/or facilitate the transfer of resources 318. As direct communications between availability zones may be constrained (e.g., limited bandwidth) or unavailable (e.g., due to network partition), in some embodiments, migration manager 240 may be configured to provide alternative network transfer paths. For instance, in some embodiments, migration manager 240 may be configured to compress and/or encrypt resources, such as data, and utilize public networks (e.g., the Internet) to transfer resources 318 to the new availability zone 302b.

Disable operation 320 may stop operation of compute instance 306a and zonal resources 304a (along network address 308a). The virtualization hosts and other system components may then be free to host other virtual compute instances or resources. However, in some embodiments, some resources, such as networking resources may remain operational to redirect network traffic to instance 312.

Figure 6:
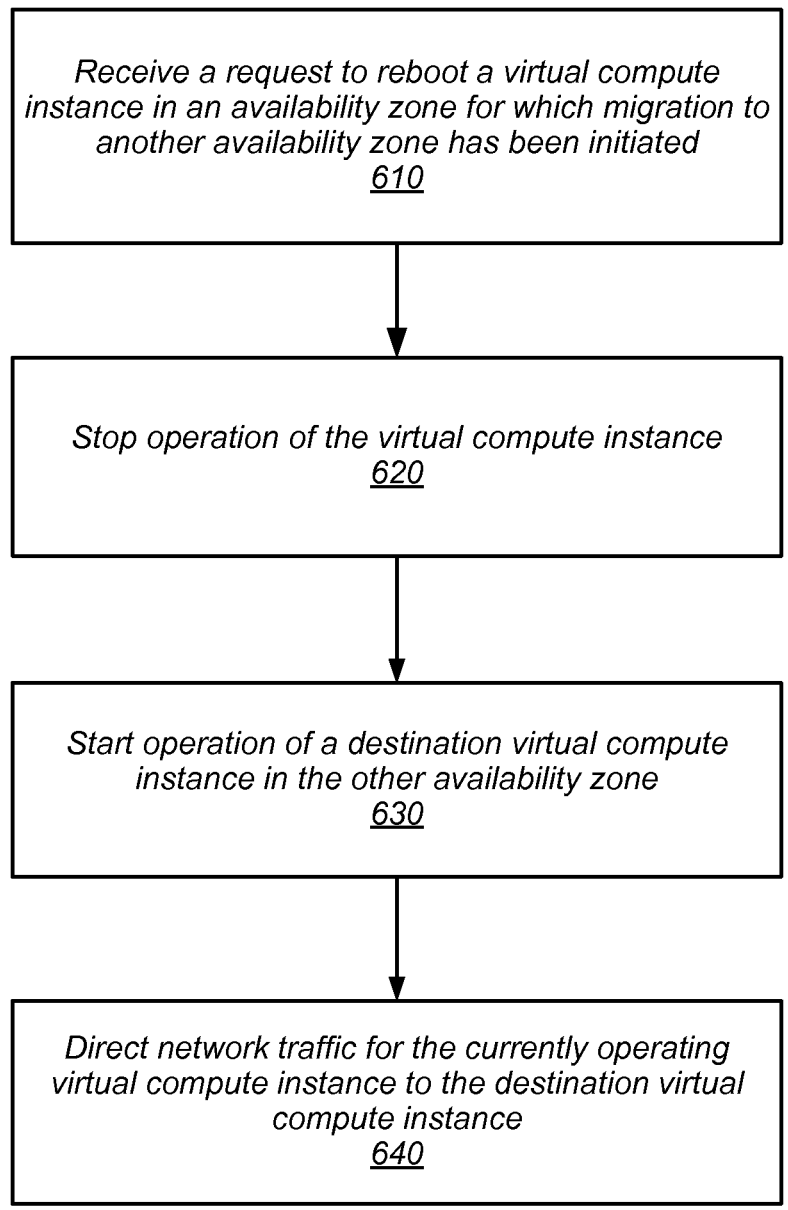
FIG. 6 is high-level flowchart illustrating various methods and techniques for providing reboot compute instance migration to another availability zone, according to some embodiments.
Figure 7:
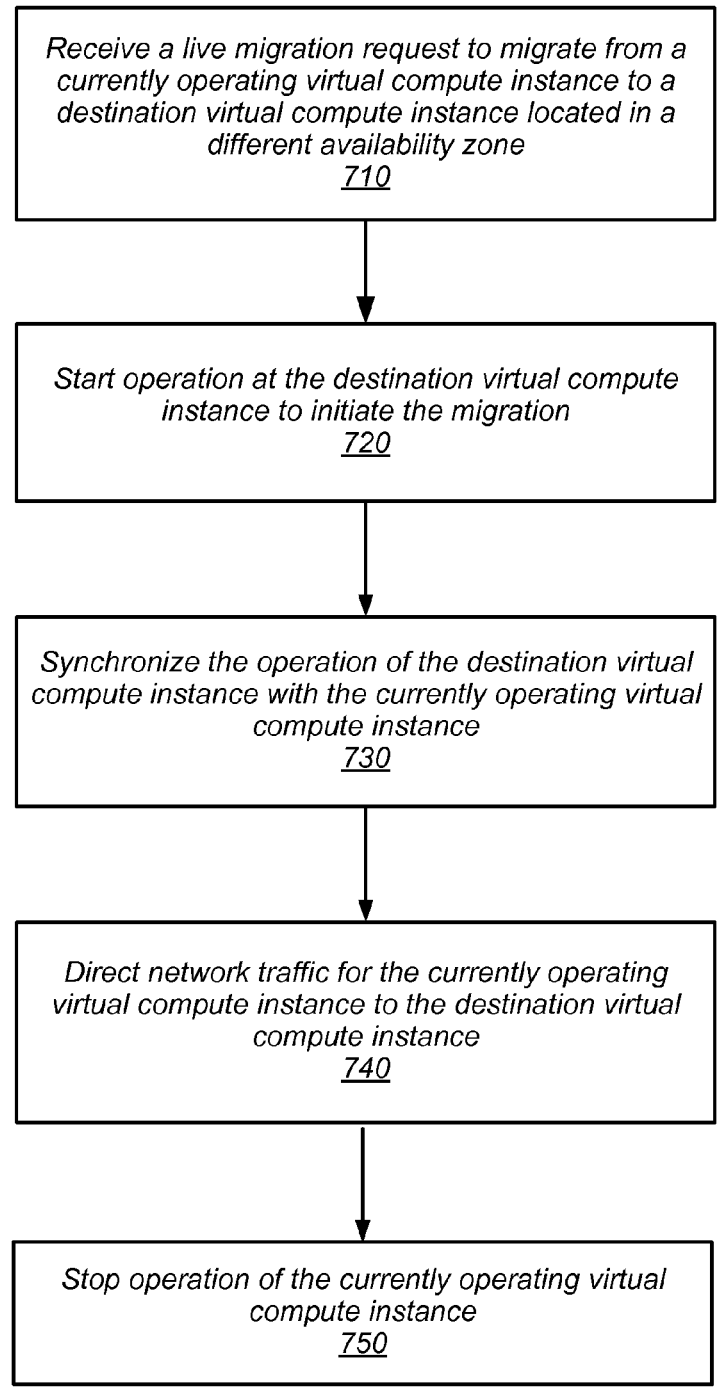
FIG. 7 is a high-level flowchart illustrating various methods and techniques for providing live compute instance migration to another availability zone, according to some embodiments.

In some embodiments, network address 308a may be implemented for compute instance 306a in order to handle requests for compute instance 306a. Once the provisioning and configuring of new instance 312 (and new resources 314) is complete, and instance 306a is disabled, migration manager 240 may move 322 network address 308a to network address 308b. For example mapping information or other network controls may be modified to direct traffic for compute instance 306a to network address 308b. In some embodiments, the same network address may be assigned to 308b as was previously used for requests to compute instance 306a. FIGS. 5-7 discussed below provide many different examples of techniques that migration manager 240 may perform to provide cross availability zone migrations, in some embodiments.

Figure 4:
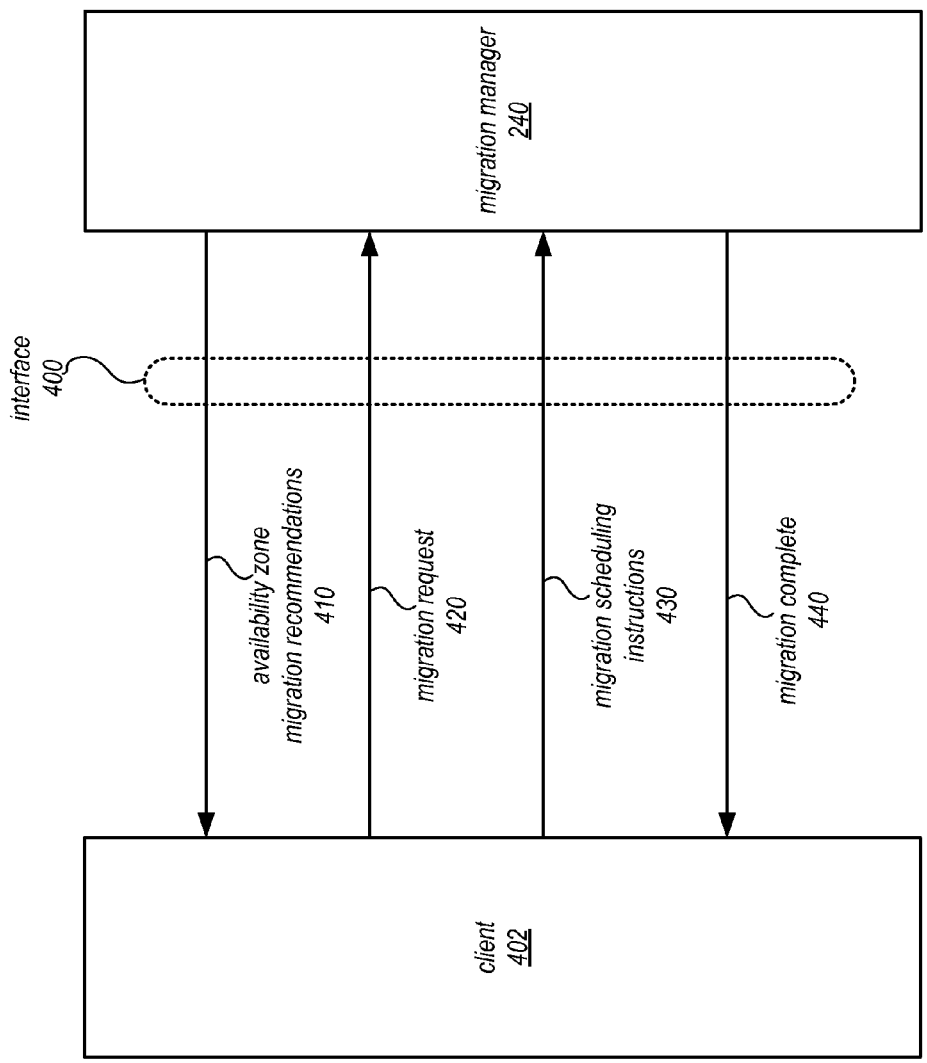
FIG. 4 is a block diagram illustrating an interface for a provider network via which clients of a provider network may submit migration requests for compute instances, according to some embodiments.

In various embodiments control plane 250 (or migration manager 240) may implement a network-based interface for via which compute instance migration requests may be received and responded. FIG. 4 is a block diagram illustrating an interface for a provider network via which clients of a provider network may submit migration requests for compute instances, according to some embodiments. Interface 400 may be a network-based interface that may provide a programmatic interface and/or a graphical interface for interacting with migration manager 240. For example, in some embodiments, interface 400 may be implemented as an application programming interface (API) according to which the requests, messages and/or responses illustrated in FIG. 4 (as well as others not illustrated) may be formatted and processed. In another example, interface 400 may be implemented as a graphical user interface (GUI) (which may be implemented in various ways, such as a website or other client-accessible tool that provides an interface via which clients can interact with).

In some embodiments, migration manager 240 may provide availability zone recommendations 410 to client 402. Availability zone recommendations 410 may be provided in response to a request for recommendations (not illustrated), a request to migrate (not illustrated), or may be pushed out to clients at various times. Availability zone recommendations 410 may be determined in various ways, such as based on the size, type and/or configuration of the currently operating virtual compute instance which may then be compared with the capacity or capabilities of different availability zones in order to identify availability zones that are able to host a destination virtual compute instance Client 402 may submit a migration request 420 via interface 400 to migration manager 240. The migration request, as discussed below with regard to FIG. 5, may specify various information about the migration operation, such as the type of migration to be performed (e.g., reboot or live migration), the timing of the migration, and/or the specific availability zone to host the destination virtual compute instance, in some embodiments. In some embodiments, separate migration scheduling instructions 430 may be provided 430 via interface 400 to migration manager 240. For example, an availability zone may be specified in a request 410 to migrate, and in response recommended timeslots may be provided to client 402 in order to make a choice for migration.

An indication or notification may be provided to client 402 via interface 400 that migration is complete. In some embodiments, client 402 may implement a long-poll or other completion discovery technique requesting status of the migration from migration manager 240. The migration complete indication 440 may also provide information about the configuration, access, and/or networking of the new destination virtual compute instance.

The examples of performing compute instance migrations across availability zones of a provider network discussed above with regard to FIGS. 2-4 have been given in regard to virtual computing resources offered by a provider network. Various other types or configurations of a provider network may implement these techniques. Compute instance migrations may, in some embodiments be performed as part of a larger migration of many different computing resources of a provider network including multiple compute instances. FIG. 5 is high-level flowchart illustrating various methods and techniques for performing compute instance migrations across availability zones in a provider network, according to some embodiments. These techniques, as well as the techniques of FIGS. 6-8 described below may be implemented using various components of a provider network as described above with regard to FIGS. 2-4 or other types or systems implementing a provider network.

A virtual compute instance may be currently operating for a client in a particular availability zone of a provider network, performing various operations, functions, services or tasks. As indicated at 510, a request to migrate the virtual compute instance located in the particular availability zone to another availability zone in the provider network may be received, in some embodiments. Availability zones, as noted earlier, may be geographically diverse, as well as fault-tolerant zones. Virtual computing resources may be independently hosted such that failures of an availability zone may be isolated to a particular availability zone. Inter-availability zone communication or network may be unavailable, limited, or otherwise constrained. Thus, a client may be unable to perform a cross availability zone migration without assistance from a control plane, migration manager, or other component of a provider network that may be configured to perform operations across availability zones that operate independently.

The request may specify a type of migration operation for the virtual compute instance (which may also be referred to herein as the original virtual compute instance). For example, in some embodiments a reboot operation may be specified to perform migration. The currently operating virtual compute instance may be rebooted, and from the perspective of the client, appear to reboot in the other availability zone. FIG. 6 discusses performing cross availability zone migration using a reboot operation in further detail. In another example, the request may specify that live migration be performed to migrate the currently operating virtual compute instance to the other availability zone. FIG. 7 discusses performing cross availability zone migration using live migration.

In some embodiments, the request may specify the availability zone to transfer the virtual compute instance to. For example, the request may include an identifier or other indicator of the specified availability zone. In some embodiments, the request may include scheduling and/or performance instructions for performing the migration. A particular timeslot (of a set of available timeslots or time periods) may be indicated, in some embodiments. The request may provide other types of scheduling instructions, such as a request that the migration be performed as soon as possible, or be completed by a particular time/date. For migrations of multiple virtual compute instances as part of batch or group migration, the request may include a scheduling instruction indicating an order for performing the migration for the virtual compute instance with respect to other virtual compute instances also being migrated. In some embodiments the request may be received from a client, control plane for the provider network or other component or device with authorization to migrate the virtual compute instance.

In some embodiments, the request may not specify or indicate the availability zone to migrate the virtual compute instance to. Instead, the availability zone may be determined after the request is received. For example, different availability zones may be evaluated to determine whether the capacity is available to host the destination virtual compute instance. The size, type and/or configuration of the currently operating virtual compute instance may be compared with the capacity or capabilities of different availability zones to identify availability zones that are able to host the destination virtual compute instance. From amongst those availability zones that are identified as able to host the destination virtual compute instance, an availability zone may be selected. For instance, an availability zone may be selected if it already hosts another virtual compute instance for the client (or alternatively if the availability zone does not host another virtual compute instance for the client). Similarly, the request may include criteria or conditions for selecting a new availability zone (though not necessarily specifying a specific availability zone) which may be used to determine the new availability zone.

In some embodiments, the request to migrate the virtual compute instance may be denied. For example, the migration of the virtual compute instance may be too costly (e.g., in terms of resources to perform the migration). If, for instance, an estimated time to perform the migration of the virtual compute instance exceeds some migration time limit, then the request to perform the migration may be denied. Alternatively, if a new availability zone to host the destination virtual compute instance cannot be determined or identified (e.g., lacking the capacity or resources to provide the virtual compute instance), then the request to perform the migration may be denied, in some embodiments. Similarly, as discussed below with regard to FIG. 8 migration may not complete (e.g., due to control plane or client abort). A restored version of the virtual compute instance may be provided to the client in the availability zone (even if it is not implemented on the same underlying host).

The request to migrate the virtual compute instance may be received, acknowledged or denied via a network-based interface, in some embodiments. The network-based interface, as discussed above with regard to FIG. 4, may allow a client or other system or device to programmatically (e.g., via an API) or interactively (e.g., via a graphical user interface) submit the migration request. Information pertaining to the migration request may also be sent and received via the network-based interface, such as scheduling instructions for performing the migration.

However the other availability zone is identified, a new virtual compute instance may be provisioned in the other availability zone as a destination virtual compute instance for the migration. For instance, a server, compute node or other system hosting virtual compute instances for the provider network may be directed to start or enable the destination virtual compute instance at the server, compute node, or other system. As indicated at 520, the destination virtual compute instance located in the other availability zone that is provisioned for the migration of the virtual compute instance may be configured based, at least in part, on a configuration of the virtual compute instance, in various embodiments. As discussed above with regard to FIG. 2, virtual compute instances may be implemented in different types, sizes, or configurations, may utilize different computing resources, or more generally may operate or perform in different ways. For example, the virtual compute instance may be a type of compute instance with certain specified performance characteristics (e.g., processing time, network capabilities, graphics processing, etc.). These performance characteristics may be provided by underlying hardware at the virtualization host that would be implementing the destination virtual compute instance. In this scenario, the destination virtual compute instance may be configured in such a way as to utilize the underlying hardware in order to provide the specified performance characteristics of the original virtual compute instance. In some embodiments, configuring the destination virtual compute instance may include launching the destination virtual compute instance with a particular machine image, software package, or any other software configuration that may be implemented/running at the original virtual compute node. A machine image may, for instance, be purchased for and running on the original virtual compute instance. Configuring the destination virtual compute instance may effectively transfer the license, use or purchase of the machine image to the destination virtual compute instance, allowing the machine image to run on the destination virtual compute instance. In some embodiments, software/hardware interfaces or controls may be updated when configuring the destination virtual compute instance in such a way so that the destination virtual compute instance may appear to be the same virtual compute instance even if improvements, upgrades, and/or patches may be implemented at the destination virtual compute instance that were not implemented for the original virtual compute instance.

In some embodiments, the original virtual compute instance may utilize other computing resources in the provider network. These other computing resources may be offered as part of a same network-based service, or different network-based services. Other computing resources may include storage resources (e.g., storage volumes, database systems or backup systems), networking resources (e.g., load balancing resources, traffic control resources or private network configurations), or any other type of computing resource that may be located in the same availability zone as the original virtual compute instance. As indicated at 530, one or more resources utilized by the virtual compute instance and located in the same availability zone may be moved to the other availability zone, in various embodiments. For example, storage resources, such as data volume, database or other set of data may be transferred to equivalent/compatible resources located in the same availability zone as the destination virtual compute instance. As with the destination virtual compute instance, computing resources may be provisioned and configured to serve as destination resources for the moved resources. If, for example, a data volume is to be transferred for use by the destination virtual compute instance, one or more storage nodes that provide storage services may be provisioned and configured to store the data volume in a same format, access scheme or configuration as the data volume was stored in the previous availability zone. Similarly, other computing resources may be provisioned and configured to operate in a same manner as in the previous availability zone.

As indicated at 540, the migration of the virtual compute instance may then be completed such that the destination virtual compute instance is currently operating for the client of the provider network instead of the virtual compute instance, in various embodiments. For example, operation at the original virtual compute instance may be stopped and the destination virtual compute instance may be made available to the client in a coordinated fashion so that it appears to the client that the virtual compute instance moved from the first availability zone to the new availability zone. In at least some embodiments, the network address (e.g., IP address) for the original virtual compute instance may be moved to the destination virtual compute instance. For instance, network traffic controllers, routers, mapping services/directories or other network controls may be configured to redirect network traffic received for the original virtual compute instance to the destination virtual compute instance. FIGS. 6 and 7 discussed below provider further examples of different migration techniques, such as reboot migration and live migration.

As indicated at 550, a notification may be sent to the client indicating that the migration of the virtual compute instance is complete. The notification may include information for accessing the destination virtual compute instance (e.g., new network address, identification of the new availability zone and/or identification of differences between the original virtual compute instance and the destination virtual compute instance). In some embodiments, the notification may be provided in response to a request from a client for a status of the migration (e.g., by a client polling to determine when the migration is complete).

In at least some embodiments, the techniques described above with regard to FIG. 5 may be performed for multiple virtual compute instances. For example, a client or control plane component or service of the provider network may schedule a batch or group of virtual compute instances for migration. The batch compute instance migration may include a schedule or ordering for performing the migrations, though some migrations may be performed in parallel in some embodiments.

As discussed above, in some embodiments, a reboot operation may be performed to implement the migration of a virtual compute instance from one availability zone to another. Performing a reboot operation may allow a migration to appear from the perspective of a client as merely a reboot of the virtual compute instance, powering down in one availability zone and starting up in another. FIG. 6 is high-level flowchart illustrating various methods and techniques for providing reboot compute instance migration to another availability zone, according to some embodiments. As indicated at 610, a request may be received to reboot a virtual compute instance for which migration to another availability zone has been initiated, in some embodiments. The request may be received from a client, for example, allowing the client to initiate completion of the migration. In some embodiments, a notification or other indication may be provided to a client indicating that the reboot operation may be performed to complete the migration. Reboot requests may be received from a control plane or other system or device that is not the client of the provider network but has authorization to complete the migration of the virtual compute instance. For example, the migration manager 240 discussed above in FIGS. 2-4, may send a request to reboot the virtual compute instance.

As indicated at 620, in response to receiving the reboot request, operation at the virtual compute instance in the availability zone may be stopped, in some embodiments. For example, the virtualization host that implements the virtual compute instance may be instructed to shutdown and/or release the virtual hardware resources and software resources of the virtual compute instance, effectively making the virtualization host able to host another virtual compute instance using the released resources. Thus, although the request may be to reboot the virtual compute instance, the operation performed may terminate or shutdown the virtual compute instance. As indicated at 630, operation of a destination virtual compute instance in the other availability zone may be started, in some embodiments. An instruction or request, for instance, may be provided to the virtualization host that implements the destination virtual compute instance (which may already be provisioned and configured for operation) to begin actively performing work, providing a service, other otherwise operating as the original virtual compute instance. Network traffic sent to the currently operating destination virtual compute instance may then be directed to the destination virtual compute instance, as indicated at 640. For example, a network endpoint, or other network traffic component may be modified or programmed to now direct traffic for the virtual compute instance to the destination virtual compute instance.

As discussed above, in some embodiments, a live migration operation may be performed to implement the migration of a virtual compute instance from one availability zone to another. Performing a live migration operation may allow the transition from an original compute instance to a destination compute instance in another availability zone to be performed live without experiencing any downtime for the virtual compute instance. FIG. 7 is a high-level flowchart illustrating various methods and techniques for providing live compute instance migration to another availability zone, according to some embodiments. As indicated at 710, a live migration request to migrate from a currently operating virtual compute instance to a destination virtual compute instance located in another availability zone may be received, in various embodiments. As discussed above with regard to element 520 in FIG. 5, a destination virtual compute resource may be provisioned and configured based on the currently operating virtual compute instance.

As indicated at 720, operation at the destination virtual compute instance may be started to initiate the migration, in some embodiments. For instance, the destination virtual compute instance may begin operating as configured. The operation of the destination virtual compute instance may be synchronized with the currently operating virtual compute instance, as indicated at 730, in some embodiments. For example, tasks, operations, or other functions performed at the original virtual compute instance may be replicated at the destination virtual compute instance. A stream of messages or indications of these tasks may be sent from the original virtual compute instance to the destination virtual compute instance so that they may be replicated, for instance. Access to other computing resources (e.g., a data volume) located in the availability zone with the original virtual compute instance and utilized by the original virtual compute instance may be provided to the destination virtual compute instance (in order to replicate or be aware of the current state of operations at the original virtual compute instance), in some embodiments.

Once synchronized, in some embodiments network traffic for the currently operating virtual compute instance may be directed to the destination virtual compute instance, as indicated at 740. For example, a network endpoint, or other network traffic component may be modified or programmed to now direct traffic for the virtual compute instance to the destination virtual compute instance. Operation of the original virtual compute instance that is currently operating may be stopped, as indicated at 750. For example, the virtualization host that implements the virtual compute instance may be instructed to shutdown and/or release the virtual hardware resources and software resources of the virtual compute instance, effectively making the virtualization host able to host another virtual compute instance using the released resources.

Figure 8:
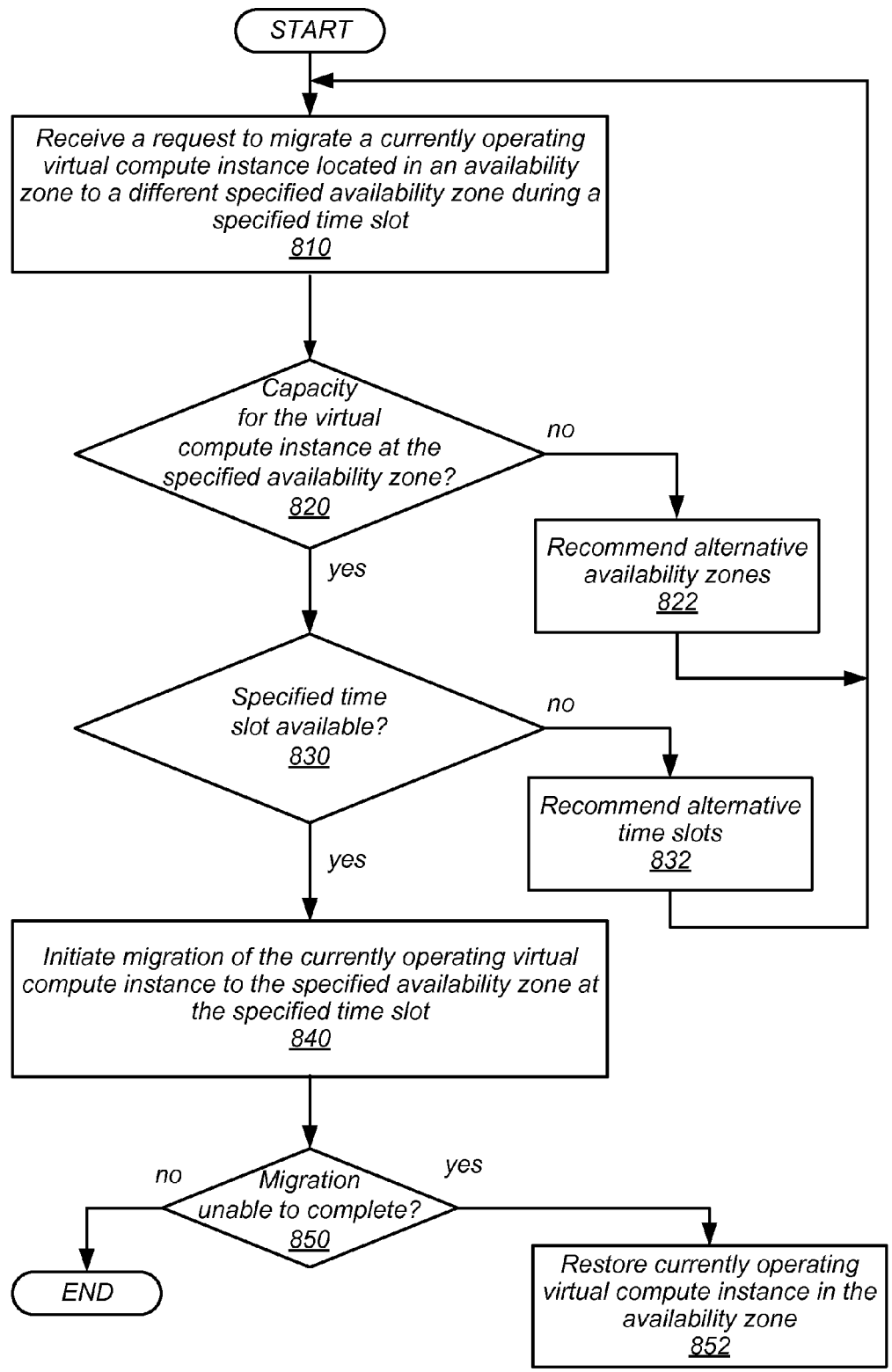
FIG. 8 is a high-level flowchart illustrating various methods and techniques for handling migration requests to move compute instances to specific availability zones, according to some embodiments.

As noted above, in some embodiments the migration request may include various information specifying certain aspects of the migration, such as a specific availability zone in which the destination virtual compute instance is located and/or scheduling instructions for determining when the virtual compute instance may be migrated. FIG. 8 is a high-level flowchart illustrating various methods and techniques for handling migration requests to move compute instances to specific availability zones, according to some embodiments. As indicated at 810, a request may be received to migrate a currently operating virtual compute instance located in an availability zone to a different specified availability zone during a specified timeslot. As indicated at 820, it may be determined whether capacity for the virtual compute instance in the specified availability zone exists to host a destination virtual compute instance. For example, if the currently operating compute instance is a particular type of compute instance with a certain set of performance characteristics (e.g., certain amount/speed of system memory, processing capabilities and networking capabilities), then the specified availability zone may be evaluated to determine whether a virtualization host located in the availability zone implementing hardware sufficient to provide the performance characteristics exists and is available to host a virtual compute instance.

If the specified availability zone does not have the capacity to host a destination virtual compute instance for the migration, then as indicated by the negative exit from 820, alternative availability zones may be recommended to the client, as indicated at 822, in some embodiments. Techniques to identify availability zones for recommendation may be similar to the techniques discussed above for identifying an availability zone to migrate an instance to. The size, type and/or configuration of the currently operating virtual compute instance may be compared with the capacity or capabilities of different availability zones in order to identify availability zones that are able to host the destination virtual compute instance. From amongst those availability zones that are identified as able to host the destination virtual compute instance, recommended availability zone(s) may be selected. In some embodiments, further constraints, preferences, or other criteria may be used to narrow down the selection of availability zones for recommendation (e.g., client may indicate preferences for an availability zone that increases diversity of availability zones for resources used by the client, providing greater durability/availability). Please note, that in some embodiments recommendations for availability zones may be provided to a client upon request, or prior to receiving a request for migration, in some embodiments, as illustrated above in FIG. 4.

If, however, the specified availability zone is available, as indicated by the positive exit from 820, then it may be determined whether the specified timeslot in the request is available for performing the migration, as indicated at 830. For example, in some embodiments, migration requests may be managed and limited to a specific number of migrations into or out of an availability zone at a time (which may reduce congestion on inter availability zone communications that may have limited bandwidth). Limitations on migrations may be enforced by providing a certain number of slots and different times for performing cross availability zone migrations. These limitations may be client-specific, so as not to provide too great a performance impact on a client if multiple virtual compute instance migrations are requested for a client. Alternatively, limitations on migrations may be implemented to provide a level of service/performance at the provider network. Thus, if no more timeslots are available at the specified timeslot, then as indicated by the negative exit from 830, alternative timeslot recommendations may be provided to the client, which are available. As with the availability zone recommendations above, timeslot recommendations (or other scheduling instructions/recommendations) be provided to a client upon request, or prior to receiving a request for migration, in some embodiments. If, the specified timeslot is available, then migration of the currently operating virtual compute instance to the specified availability zone and specified timeslot may be initiated, as indicated 840, according to the various techniques discussed above.

As indicated at 850, migrations for some virtual compute instances may be unable to complete. For example, the size/configuration of the virtual compute instance may be difficult to transfer, a destination availability zone may no longer be available, or attached or utilized zonal resources may be unavailable for transfer. In some embodiments, a client or control plane may request the migration be aborted. If the migration is unable to be completed, as indicated by the negative exit from 850, then a restored version of the original virtual compute instance may be provided in the original availability zone. Note that in some embodiments, the restored version of the availability zone may not be implemented on the same virtualization host as prior to initiating the migration. However, the restored version of the original virtual compute instance may be configured similar to the configuration of a destination compute instance described above with regard to FIG. 5.

Please note that the above description and illustration in FIG. 8 is not intended to be limiting as to other ways in which specified availability zones, timeslot requests, and/or migration abortions may be handled. In some embodiments, a request may specify either an availability zone or a timeslot, and thus only some of the different elements may be performed (possibly along with additional elements).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 9:
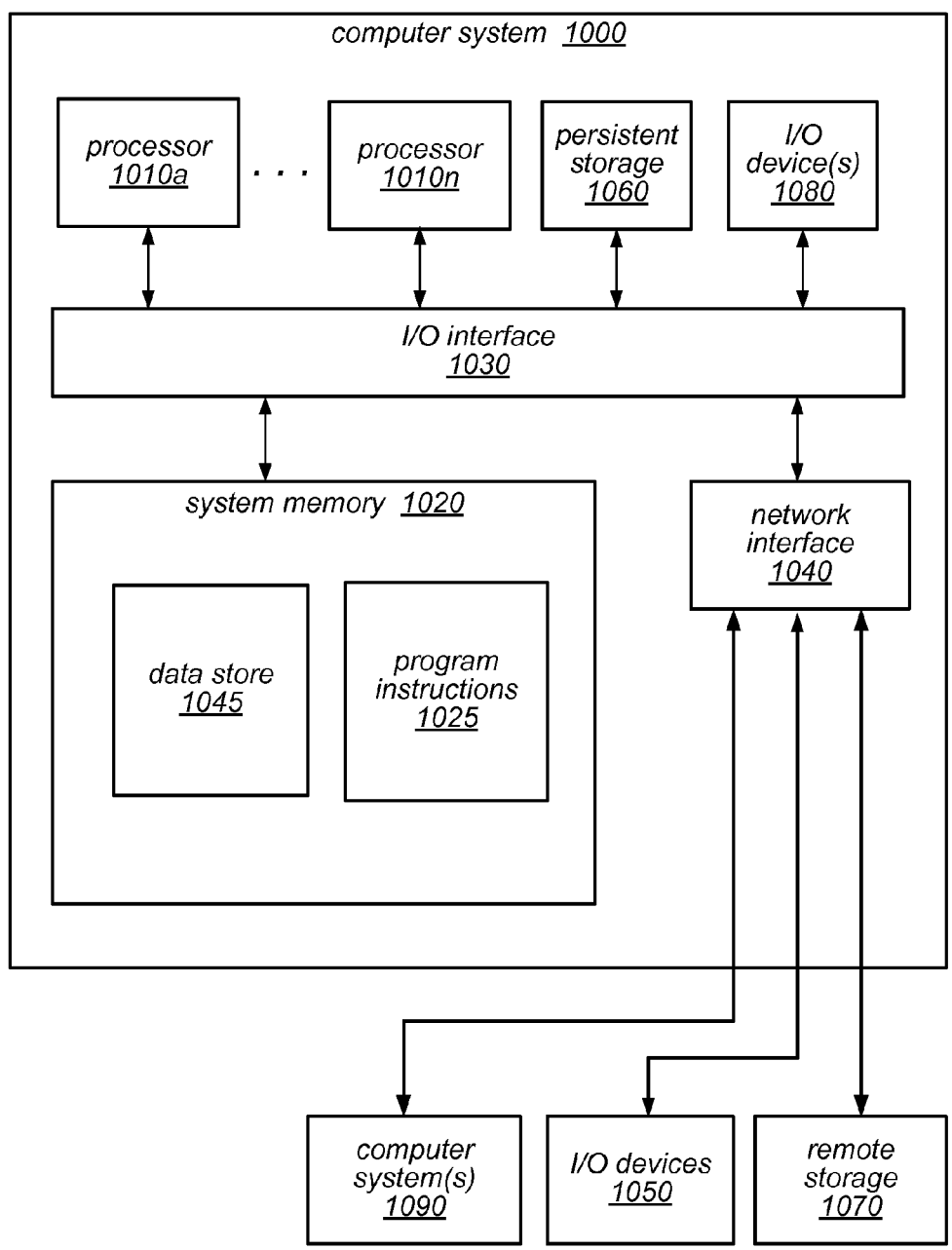
FIG. 9 is a block diagram illustrating an example computing system, according to some embodiments.

Performing compute instance migrations across availability zones of a provider network as described herein may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a plurality of compute nodes that together implement a provider network that provides virtual computing resources to clients and a network-based interface configured to process requests for the provider network, wherein individual ones of the plurality of computing nodes are located in different ones of a plurality of availability zones implemented as part of the provider network;
    one or more of the plurality of compute nodes that together implement a migration manager for the provider network, configured to:
        receive a request to migrate a virtual compute instance hosted at a compute node located in a particular availability zone to another availability zone of a provider network, wherein the virtual compute instance is currently operating for a client of the provider network, wherein the request to migrate the virtual compute instance is received from the client via the network-based interface, and wherein the particular availability zone and the other availability zone provide geographically diverse, fault-tolerant zones for hosting respective virtual computing resources such that in the event of a failure of one of the particular availability zone or the other availability zone the respective virtual computing resources hosted at a remaining availability zone continue operation;
        configure a destination virtual compute instance hosted at another compute node located in the other availability zone that is provisioned for migration of the virtual compute instance, wherein the configuration is based, at least in part, on a current configuration of the virtual compute instance;
        complete the migration of the virtual compute instance such that the destination virtual compute instance is currently operating for the client of the provider network, wherein the virtual compute instance is not currently operating for the client of the provider network; and
        send a notification to the client indicating the completion of the migration for the virtual compute instance.

2. The system of claim 1, wherein to complete the migration of the virtual compute instance such that the destination virtual compute instance is currently operating for the client of the provider network, the migration manager is configured to:
    receive a request to reboot the virtual compute instance;
    stop operation of the virtual compute instance; and
    start operation of the destination virtual compute instance.

3. The system of claim 1, wherein the provider network provides the virtual computing resources to clients as a network-based virtual computing service implemented as part of the provider network, wherein the provider network implements one or more other network-based services, wherein the virtual compute instance utilizes one or more resources provided by the one or more other network-based services that are located in the particular availability zone, and wherein the migration manager is further configured to:
    move the one or more resources to the other availability zone for use by the destination virtual compute instance.

4. A method, comprising:
    performing, by one or more computing devices:
        receiving a request to migrate a virtual compute instance located in a particular availability zone to another availability zone of a provider network, wherein the virtual compute instance is currently operating for a client of the provider network, wherein the request to migrate the virtual compute instance is received from the client of the provider network via a network-based interface for the provider network, and wherein the particular availability zone and the other availability zone provide independently accessible, fault-tolerant zones for hosting virtual computing resources;
        configuring a destination virtual compute instance located in the other availability zone that is provisioned for migration of the virtual compute instance, wherein the configuration is based, at least in part, on a configuration of the virtual compute instance; and
        completing the migration of the virtual compute instance such that the destination virtual compute instance is currently operating for the client of the provider network, wherein the virtual compute instance is not currently operating for the client of the provider network.

5. The method of claim 4, wherein the request to migrate the virtual compute instance specifies the other availability zone for the migration, and wherein the method further comprises:
determining that capacity to host the destination virtual compute instance exists in the specified other availability zone; and
in response to said determining, performing said configuring and said completing.

6. The method of claim 5, prior to receiving the request to migrate the virtual compute instance, providing one or more candidate availability zones to the client for migration of the virtual compute instance, wherein the specified other availability zone is included in the one or more candidate availability zones.

7. The method of claim 4, wherein the request to migrate the virtual compute instance specifies a timeslot for performance of the migration, and wherein the method further comprises:
determining that the specified timeslot for the migration is available; and
in response to said determining, performing said configuring and said completing.

8. The method of claim 4, wherein said completing the migration of the virtual compute instance such that the destination virtual compute instance is currently operating for the client of the provider network, comprises reassigning a network address for the virtual compute instance to the destination virtual compute instance such that network traffic directed toward the network address is received at the destination virtual compute instance.

9. The method of claim 4, further comprising moving one or more network-based resources utilized by the virtual compute instance and located in the availability zone to the other availability zone for use by the destination virtual compute instance.

10. The method of claim 4, wherein said completing the migration of the virtual compute instance such that the destination virtual compute instance is currently operating for the client of the provider network, comprises:
receiving a request to reboot the virtual compute instance;
in response to receiving the request to reboot the virtual compute instance:
stopping operation of the virtual compute instance;
starting operation of the destination virtual compute instance; and
directing requests for the virtual compute instance to the destination virtual compute instance.

11. The method of claim 4, further comprising:
receiving, from another client, another request to migrate another virtual compute instance located in a respective availability zone to a different availability zone of the provider network;
subsequent to initiating migration for the other virtual compute instance, determining that the migration for the other virtual compute instance is unable to complete;
in response to determining that the migration of the other virtual compute instance is unable to complete, providing a restored version of the other virtual compute instance in the respective availability zone for the other client.

12. A non-transitory, computer-readable storage medium, storing program instructions that when executed by one or more computing devices cause the one or more computing devices to implement:
receiving a request to migrate a virtual compute instance located in a particular availability zone to another availability zone of a provider network, wherein the virtual compute instance is currently operating for a client of the provider network, wherein the request to migrate the virtual compute instance is received from the client of the provider network via a network-based interface for the provider network, and wherein the particular availability zone and the other availability zone provide geographically diverse, fault-tolerant zones for independently hosting respective virtual computing resources;
configuring a destination virtual compute instance located in the other availability zone that is provisioned for migration of the virtual compute instance, wherein the configuration is based, at least in part, on a current configuration of the virtual compute instance;
completing the migration of the virtual compute instance such that the destination virtual compute instance is currently operating for the client of the provider network, wherein the virtual compute instance is not currently operating for the client of the provider network; and
providing a notification to the client indicating the completion of the migration for the virtual compute instance.

13. The non-transitory, computer-readable storage medium of claim 12, wherein the request to migrate the virtual compute instance specifies the other availability zone for the migration, and wherein the program instructions cause the one or more computing devices to further implement:
determining that capacity to host the destination virtual compute instance exists in the specified other availability zone; and
in response to said determining, performing said configuring and said completing.

14. The non-transitory, computer-readable storage medium of claim 12, wherein the program instructions cause the one or more computing devices to further implement:
receiving, from another client, another request to migrate another virtual compute instance located in a respective availability zone to a specific availability zone of the provider network; and
in response to determining that the specific availability zone of the provider network lacks capacity to host a new virtual instance for the migration of the other virtual compute instance, send a response to the other client denying the other migration request.

15. The non-transitory, computer-readable storage medium of claim 12, wherein the request to migrate the virtual compute instance is received from a control plane implemented for the provider network.

16. The non-transitory, computer-readable storage medium of claim 12, wherein the program instructions cause the one or more computing devices to further implement moving one or more network-based resources utilized by the virtual compute instance and located in the availability zone to the other availability zone for use by the destination virtual compute instance.

17. The non-transitory, computer-readable storage medium of claim 12, wherein the request to migrate the virtual compute instance is a live migration request, and wherein in said completing the migration of the virtual compute instance such that the destination virtual compute instance is currently operating for the client of the provider network, the program instructions cause the one or more computing devices to implement:
    starting operation at the destination virtual compute instance for the client;
    synchronizing the operation at the destination virtual compute instance with the virtual compute instance;
    directing requests for the virtual compute instance to the destination virtual compute instance; and
    stopping operation of the virtual compute instance.

* * * * *